March 17, 1964  F. W. TAUBER ETAL  3,125,017
RAPID PROCESSING OF FRANKFURTERS
Filed Nov. 1, 1960  3 Sheets-Sheet 2

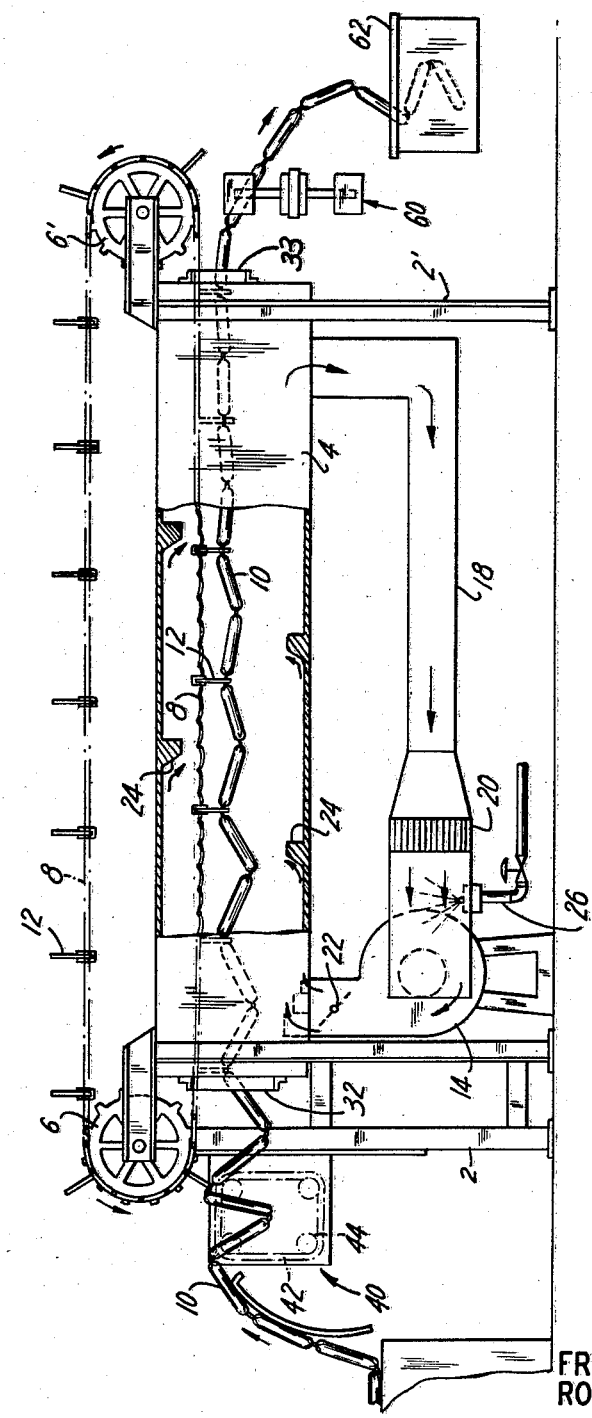

INVENTORS
FRANCIS W. TAUBER
ROY N. OLSON
BY
ATTORNEY

March 17, 1964   F. W. TAUBER ETAL   3,125,017
RAPID PROCESSING OF FRANKFURTERS
Filed Nov. 1, 1960   3 Sheets-Sheet 3

INVENTOR.
FRANCIS W. TAUBER
ROY N. OLSON
BY
ATTORNEY

United States Patent Office 3,125,017
Patented Mar. 17, 1964

3,125,017
RAPID PROCESSING OF FRANKFURTERS
Francis W. Tauber, Chicago, and Roy N. Olson, Worth, Ill., assignors to Union Carbide Corporation, a corporation of New York
Filed Nov. 1, 1960, Ser. No. 66,497
1 Claim. (Cl. 99—443)

This invention relates to a method of and apparatus for processing meat products, and more particularly, to rapidly processing meat products from a comminuted meat emulsion.

The conventional method for manufacturing shaped meat products, such as skinless frankfurters, comprises preparing an emulsion with meat, spices and curing agents, and stuffing the free flowing emulsion into precisely sized artificial casings and preferably cellulosic casings. The emulsion is not merely allowed to fill the casing, but is fed into the casing under some pressure which, after mechanical linkings, forms a firm container, permeable to moisture and curing smoke, of a predetermined diameter and length for cooking to a desired uniform weight. The strand of encased, linked meat emulsion is then cooked and/or smoked, to coagulate the meat proteins of the emulsion and create a rigid solid with a smooth surface formation. Proper cooking and smoking has three principal functions: first, to destroy or inhibit bacterial growth which causes spoilage of the meat; second, to impart the specific flavor and texture to the product which the local market demands; and third, to produce the color development in the meat and surface formation, demanded by the public.

The sealing of food surfaces by mild drying is a common practice with processed foods. Cheddar cheese, marshmallows, bread and sausage are a few of the items in which the production of a sealed surface is important for preservation. In sausage manufacturing, this dry-curing operation is commonly done in a "smokehouse." A smooth surface formation on the sausage is very important, not only for acceptable appearance, but to extend "shelf life" of the product and to permit efficient performance of mechanical casing peeling equipment which is widely used by producers of skinless frankfurters.

After the stuffed, linked emulsion has been properly cooked and/or smoked, it is showered with water and chilled. The chilled linked sausage is then peeled and/or packaged into individual sausages ready for shipping or storage.

Concurrent with striving to find ways to improve an already commercially acceptable product, sausage manufacturers are also continually striving to increase productivity to offset rising labor costs. One particular area in which productivity may be increased, is by decreasing smokehouse cooking and handling time. If the strand of sausage could be processed continuously, labor could be eliminated which formerly was required to hang and remove batches of sausages on racks, and to transport the rack into and out of the smokehouse and cold shower.

However, the cooking operation must meet certain requirements. As for example, the Meat Inspection Division of the U.S. Department of Agriculture requires that the internal temperature of a frankfurter should attain a minimum temperature of 137° F. "Good practice" in the industry dictates that the minimum internal temperature of 137° F. should be held for five minutes. The American Meat Institute Foundation recommends cooking sausage to an internal temperature of 150° F., for prevention of bacterial spoilage in the meat and has found that 155° F. is effective in most cases in preventing bacterial "greening." Currently, to insure that the internal temperature of the meat emulsion reaches the prescribed temperature for the desired length of time, the cooking and/or smoking operation may require 1½ to 3 hours per batch, depending upon the type of emulsion, casing and conventional smokehouse that is used.

In a conventional smokehouse, the sausage product is dried and cooked by the circulation of low velocity heated gas. The strands of linked product are spiralled over smoke sticks depending therefrom in loops, in close proximity to each other. A plurality of smoke sticks are hung on a metal rack and a number of racks are hung from rails in smokehouse compartments. Thus, the sausage product hung near the middle of the rack in a smokehouse, is screened from the full drying effect of the heated gas. The product is initially processed at a low gas temperature (under 100° F.) to dry the surface and then the gas temperature is raised to about 180° F. to cook the product. Heat transfer to the product results from the sum total effect of conduction, convection, and radiation.

The problem is then to reduce processing requirements to a fraction of the time presently needed and make the process continuous without adversely affecting color, flavor and texture. In addition, peelability qualities, and bactericidal factors of the sausage product should not be impaired.

Heretofore, attempts to rapidly cook batches of frankfurters in a conventional smokehouse operated at a high temperature, such as in excess of 180° F. have not been successful because the product had poor color development (the meat surface was too brown). Such operation also resulted in adhesion of the casing to the meat surface and the mechanical peelability factor was not good or acceptable. More particularly, when it is attempted to peel cellulosic casing from sausages cooked in high-temperature conventional smokehouses by mechanical peeling operations, the surface formation of the meat is scarred and/or torn from the meat mass and the resulting frankfurter cannot be sold as a commercial sausage product. The undesirable adhesion of casing to the meat surface is believed to be caused by the high temperature, coagulating and precipitating the proteins of the meat emulsion onto the casing inner surface.

Still further attempts to decrease cooking time in smokehouses by using moderate velocity gaseous movement, such as a turnover of 4 to 8 times per minute, have not been successful because the air movement could not be effectively and uniformly directed to the surface of the entire sausage product in the smokehouse. As a consequence, to obtain best results by this method, it took from 1 to 2 hours to process the product satisfactorily.

Accordingly, it is one object of this invention to decrease to a fraction the time heretofore required for the cooking and/or smoking of an encased and linked meat emulsion.

Another object of this invention is to rapidly process an encased and linked meat emulsion into sausage having acceptable color, flavor, texture and bacterial factors, and from which the casing is readily peeled.

Still another object of this invention is to continuously and rapidly coagulate the meat proteins in an encased and linked meat emulsion to form a rigid solid having a smooth and firm surface formation.

Other and additional objects will become apparent hereinafter.

According to the present invention, shaped meat products are formed from a continuous strand of encased comminuted meat emulsion having tie portions between the links, by an apparatus which comprises a horizontally elongated cooking tunnel; a conveyor for transporting said strand of encased links longitudinally through the cooking tunnel, said conveyor having a continuous link chain extending horizontally through the cooking tunnel with hooks depending vertically from said chain within said tunnel, said hooks being spaced along said chain at a distance less than the length of two cooked links; feed unit having means for engaging alternate tie portions and advancing said strand longitudinally, and means for displacing said alternate tie portions of said strand sideways onto said depending hooks at the input end of said tunnel so that said links hang from said hooks in a V-shape; means for feeding a hot stream of gas at a high velocity through said cooking tunnel for cooking the encased meat emulsion; and means for doffing the links of encased shaped meat product from said depending hooks at the output end of said tunnel. Surprisingly, the stream of heated gas rapidly produces a surface formation on the encased meat which permits easy removal of the cellulosic casing, and heats the encased meat emulsion above the minimum temperature level of Federal Food Regulations, whereby said meat emulsion rapidly dries with a minimum loss of weight, and quickly coagulates into a self-supporting mass of the proper flavor and (firm but tender) texture and thereby provides an acceptable (pink) color development in the interior and (red) surface formation on the individual sausages.

It is believed that in the practice of the present invention, drying of the exterior surface of the meat emulsion occurs through the initially permeable casing wall, prior to the actual coagulating and precipitating of the meat proteins thereon to substantially eliminate the adverse adhesion of the casing wall to the meat products. Ordinarily, high temperature converts some type of meat proteins to gelatin, which is then cooked to adhere tightly to the casing wall.

The rapid surface drying of the product by high velocity air produces an initial shrink to the enveloping cellulosic casing. Shrinkage pressurizes the encased meat emulsion, and thereby yields a very compact, smooth surface formation which quickly develops the firm but tender texture in the meat. The very smooth dry meat surface provides a ready release of the casing therefrom which yields excellent productivity in mechanical peeling operations.

The nature of the invention and the manner in which this invention can be practiced will become clear from the detailed description when taken in conjunction with the accompanying drawings forming a part of this specification and wherein like reference numerals designate like parts, except as otherwise indicated.

FIGURE 1 is a side elevation, partially in section of one embodiment of apparatus for carrying out the invention;

Figure 3:
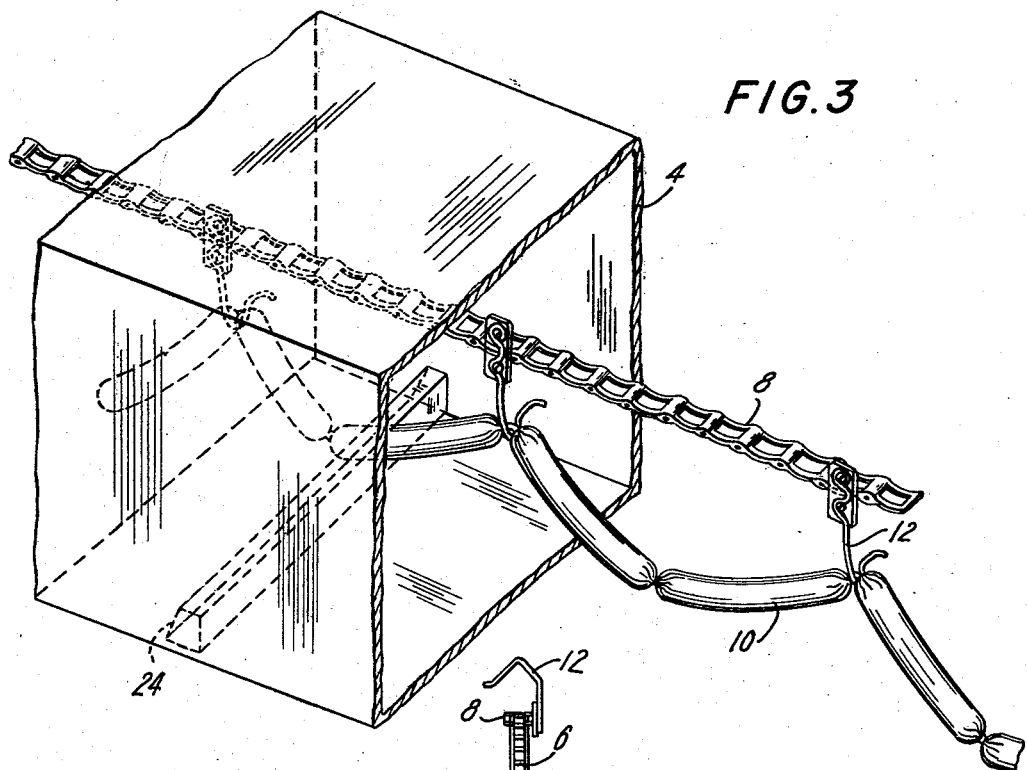
FIGURE 3 is an enlarged perspective of a portion of the duct of apparatus shown in FIGURE 1.

Referring to the drawings, the apparatus shown in FIGURE 1 comprises angle supports 2, 2′ which cradle a rectangularly shaped circulating gas cooking tunnel 4 that serves as an elongated heated zone. Conveyor chain sprockets 6, 6′ mounted on the supports 2, 2′, respectively, and driven by a conventional motor means, not shown, align and transport a continuous link chain 8 through the cooking tunnel 4 entering at its input end opening 32, and emerging at its output end opening 33. Wire hooks 12 affixed to the chain 8 are arranged to depend from its lower flight as they pass through the cooking tunnel 4. To compensate for shrinkage of frankfurter units during cooking, such as 6 to 10 percent, the wire hooks 12 are spaced along the chain 8 at a distance less than two cooked frankfurter lengths.

A feed unit 40 engages and advances an encased linked sausage strand 10 and synchronizes and places alternate tie portions of frankfurter links sideways onto the depending wire hooks 12 at the input end of the cooking tunnel 4. As shown in FIGURE 1, each two frankfurter units in an uncooked condition hang from the hooks 12 in a V-shape because the distance between hooks 12 is less than the length of two cooked frankfurter units and approach a straight line due to shrinkage as they are cooked.

The strand of frankfurters is transported through by the conveyor chain 8 in the time necessary to cook the product in a high velocity heated gas such as air or wood smoke, circulated through tunnel 4 by means of blower 14, connected thereto by a supply duct 16 and a return duct 18. The gas is heated by a steam coil 20 and the velocity of the gas in the cooking tunnel 4 is controlled by a damper 22. Humidity of the gas stream is controlled by a steam injection means 26. In the cooking tunnel 4, the heated air is periodically redirected across the product by vanes 24 spaced along the inner surfaces of its top or bottom walls in staggered relation, thus increasing the scrubbing action of the high velocity heated air on the product surface.

Figure 2:
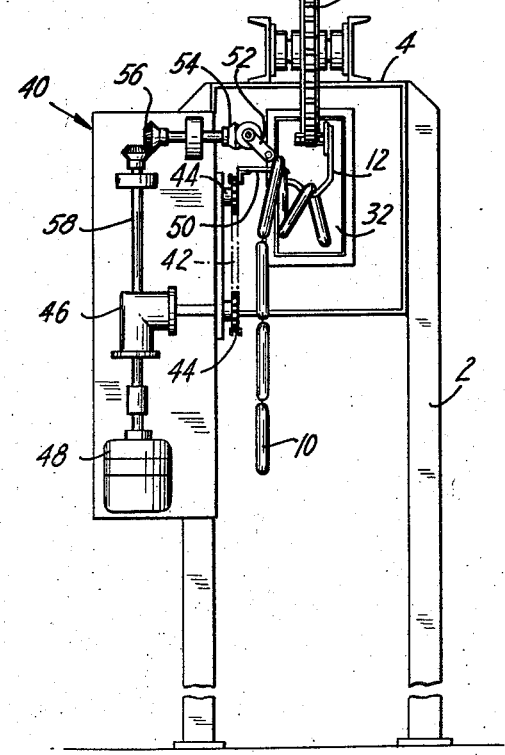
FIGURE 2 is an end view of the entrance of the apparatus shown in FIGURE 1.
Figure 5:
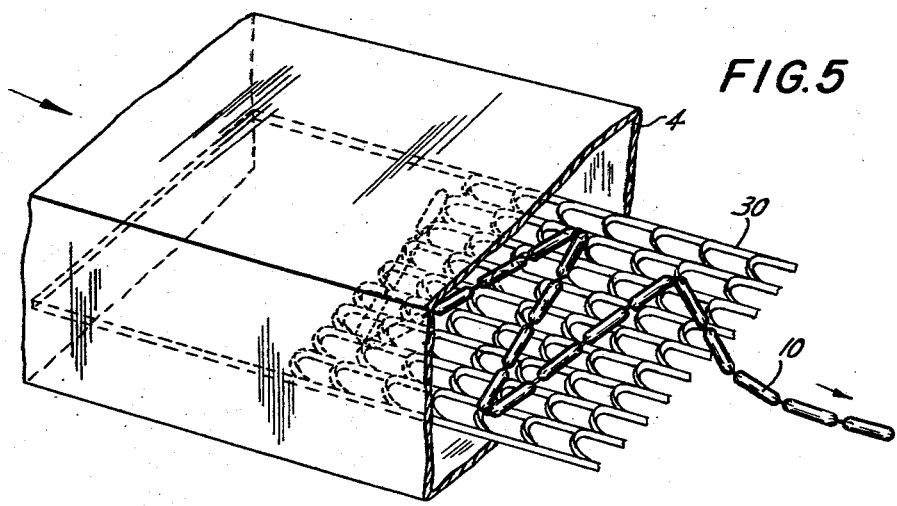
FIGURE 5 is an enlarged perspective of a portion of the duct of apparatus shown in FIGURE 4.

Referring now to FIGURE 2, the feed unit 40 comprises continuous roller chain 42 operated in a vertical plane over sprockets 44 by a right angle gear drive 46 driven by a motor 48. Direction and speed of the chain 42 is synchronized with the conveyor chain 8. Fingers 50 are affixed outstanding to the chain 42, i.e. toward the center of the cooking tunnels, and spaced to engage every second frankfurter link at the leading end tie. The chain 42 is offset to the centerline of the cooking tunnel 4 so that the frankfurter strand 10 can be engaged by the fingers 50 and advanced and elevated to the position where a pusher arm 52 engages and slides the frankfurter strand 10 from the finger 50 onto the hook 12. Operation of the pusher arm 52 to displace the frankfurter strand 10 sideways is synchronized with alignment of the finger 50 and the hook 12 at the pusher position. The pusher arm 52 is actuated by bevel gear sets 54, 56 driven by a shaft 58 as an extension of the gear drive 46.

At the output end of the cooking tunnel 4, a doffing device 60 in the form of an intermittently operated paddle wheel, doffs the frankfurter strand 10 sideways from the hooks 12 and deposits it into a receiving container 62.

Figure 4:
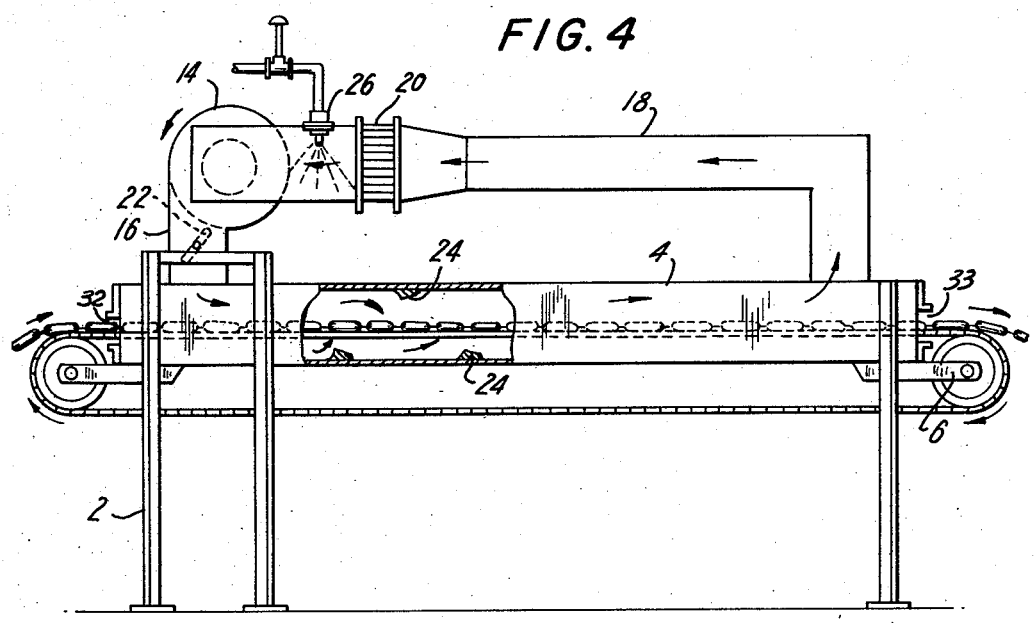
FIGURE 4 is a side elevation, partially in section of another embodiment of apparatus for carrying out the invention.

The apparatus in FIGURE 4 comprises a cooking tunnel 4 with circulating gas components of similar function and like numbers as in the description of FIGURE 1. Encased sausage 10 is laid onto an open mesh conveyor belt 30 in a zig-zag manner and transported through tunnel 4 thereon, in the time necessary to cook the product 10.

The cooking apparatus illustrated in FIGURES 1 and 4 can be employed in cooking a sausage product in either one or two stages. Preferably, two-stage cooking is conducted by arranging two cooking tunnels 4 in tandem relationship and by having one sausage conveyor system. A conveyor pulley 6 is mounted at the entrance end of the first cooking tunnel and a second pulley 6 is mounted at the exit end of the second cooking tunnel. Such pulleys can obviously be made to transport the continuous belt 8 or the open mesh belt 30 through the tunnels. Each cooking tunnel is of sufficient length to insure proper cooking time for each phase thereof. However, it is to be understood, two-stage cooking can be done by batch operation wherein a single tunnel 4 as shown in FIG. 1 or FIG. 4 is used. A length of sausage product is placed in the tunnel 4 and the temperatures and velocities of the cooking gas passing through the tunnel are regulated for each stage of cooking.

In one-stage cooking, meat emulsion encased in cellulosic casing permeable to smoke and moisture and of a size that the ratio of product surface (surface area) to meat emulsion volume (cubic inches) is greater than 3 to 1 is fed through the cooking tunnel 4 by either the conveyor chain 8 or open mesh screen 30. A gaseous medium such as air with a dispersion of smoke at a temperature of 190° F. to 210° F. is fed through the cooking tunnel at a velocity of about 2000 to 4000 feet per minute by means of the blower 14. The high velocity heated smoke wholly envelopes the encased sausage meat emulsion, cooking it within 10 to 12 minutes into a tender homogeneous mass with desirable flavor, color and surface formation, which after cooking and cooling, allows the casing to be readily peeled therefrom in mechanical peeling equipment to yield a commercially desirable unit sausage.

In the two-stage cooking of the encased meat emulsion as hereinafter described, the cooking time can be still further decreased. In a "constant rate drying" zone, the temperature of the air wholly enveloping the meat emulsion is elevated and controlled by the wet bulb depression, to govern the rate of drying desired for a given air velocity and ratio of "surface area to volume" of the product.

In the first stage of cooking with air at a temperature of about 230° F., and a velocity of about 4000 feet per minute, an encased meat emulsion having a surface to volume ratio of 5.1 to 1 was brought to an internal temperature of 137° F. and a surface temperature of 162° F. within 4½ minutes. The encased sausage was then removed to the "falling rate" or second stage cooking zone where air at a temperature of 160° F. and a velocity of 1600 feet per minute dried it for 5 minutes to conform to trade practice of "holding" at the internal temperature of 137° F. for that time, and to develop commercially suitable texture and color. By two-stage cooking, the meat emulsion can be cooked in 10 minutes.

Thus, in either the one-stage cooking or the two-stage cooking, processing of an encased meat emulsion is reduced to a fraction of time required in processing the encased meat emulsion by the conventional smokehouse; that it, from 90 to 180 minutes, it is reduced to 10 to 12 minutes.

It is to be noted the relative humidity of the surrounding atmosphere will influence the rate of drying or humidification of the casing and is a means of controlling the moisture levels for a period of time that is practical for good peeling performance. Thus, it has been found in one-stage cooking for a cooking gas of air at the temperature and velocity levels set forth in Table II, a relative humidity of about 3 percent to 8 percent is practical for good peeling performance wherein a cellulosic material is used to encase a frankfurter meat emulsion. Correspondingly, in two-stage cooking for a cooking gas of air at the temperature and velocity levels set forth in Table III a relative humidity of about 3 percent to 5 percent for the first stage, and of about 5 percent to 10 percent for the second stage has been found satisfactory.

The details and manner of practicing this invention will become apparent by reference to the following specific examples, it being understood that these examples are merely illustrative embodiments of the invention and that the scope of the invention is not limited thereto.

EXAMPLE I

Frankfurters were prepared from emulsion as tabulated in Table I, and stuffed into moisture and smoke permeable 25/32 inch diameter cellulosic casings wherein the ratio of product surface to product volume was 5½ to 1. The casings were stuffed with the described emulsions on a conventional stuffer, fitted with a standard stuffing horn for the casing used, and linked to 5½ to 6 inches long links on a conventional driven mechanical linker. The frankfurters were cooked in a rectangular cooking tunnel 10 inches wide by 8 inches high and about 20 feet long, such as illustrated in FIGURES 1 and 4. A large percentage of the tests were performed on an arrangement similar to that described in FIGURE 1. Some tests were run on the arrangement described in FIGURE 4 to determine whether the cooked product would be marked by the mesh of the conveyor belt. No mesh marks were formed on the finished product. Table II is a tabulation of 7 runs using different emulsions cooked at temperatures ranking from 190° F. to 215° F., for time intervals from 5 to 10 minutes. All runs yielded a commercially acceptable product.

EXAMPLE II

Frankfurters were prepared from the emulsion formulation as tabulated in Table I and stuffed into moisture and smoke permeable 25/32 inch diameter cellulosic casings in the manner described in Example I. The frankfurters were cooked in two stages as hereinbefore described. Table III is a tabulation of 3 runs of two-zone cooking wherein is demonstrated the desirability of employing cooking gas velocities of at least about 3000 feet per minute during the first stage, but that the second stage drying can be satisfactorily effected at lower gas velocities such as at least 1600 f.p.m. All runs yielded a commercially acceptable product in about 10 minutes.

TABLE I

| Analysis, percent | Emulsion | | |
|---|---|---|---|
| | A | B | C |
| Moisture | 62.9 | 59.1 | 54.6 |
| Fat | 17.2 | 25.9 | 30.6 |
| Protein | 12.2 | 11.7 | 11.0 |
| Ash | 1.6 | 2.5 | 2.3 |
| Sub-total | 93.9 | 99.2 | 98.5 |
| Extender [1] | [3] 10 | None | None |
| Additive [2] for color formation | None | 0.06 | 0.06 |

[1] Extender is comprised of dried skimmed milk and wheat flour.
[2] Ascorbic acid, sodium ascorbate or sodium isoscorbate—⅞ oz. per 100 lbs. of formulation.
[3] Approximate.

TABLE II

| Run No. | Dryer temp., °F. | Time, minutes | Relative humidity | Air velocity, f.p.m. | Emulsion | Color | Peeling performance | Frankfurter internal temperature, °F. |
|---|---|---|---|---|---|---|---|---|
| 1 | 190 | 10 | 7 | 2,700 | A | Fair | O.K. | 153 |
| 2 | 190 | 15 | 7 | 2,700 | A | do | O.K. | 164 |
| 3 | 190 | 10 | 8 | 3,250 | A | do | O.K. | 158 |
| 4 | 190 | 10 | 4 | 3,300 | C | do | O.K. | 152 |
| 5 | 210 | 10 | 6 | 3,200 | A | Good | O.K. | 162 |
| 6 | 210 | 10 | 3½ | 3,400 | C | do | O.K. | 174 |
| 7 | 230 | 6 | 4 | 2,700 | A | Fair | O.K. | 166 |

NOTE:—Fair or good color formation is commercially acceptable.

TABLE III

| Run | Stage | Dryer temp., °F. | Relative humidity | Air velocity, f.p.m. | Time, minutes | Emulsion |
|---|---|---|---|---|---|---|
| 1 | 1 | 250 | 4 | 4,150 | 5 | B |
|   | 2 | 160 | 5 | 1,600 | 5 |   |
| 2 | 1 | 230 | 4½ | 4,150 | 5 | B |
|   | 2 | 160 | 5 | 1,600 | 5 |   |
| 3 | 1 | 210 | 5 | 3,800 | 6 | B |
|   | 2 | 160 | 5 | 1,900 | 5 |   |

NOTES:
1. The above runs heated the frankfurter meat emulsion to an internal temperature in excess of 137° F.
2. The above runs yielded frankfurters having commercially acceptable color and peeling performance.

Control frankfurters of meat emulsions as described in Examples I and II were made for comparison with the "rapid-cook" test runs. They were processed in a normal manner in a conventional smokehouse and took from 2½ to 3 hours to obtain commercially acceptable color and texture development. They attained an internal temperature of 150–155° F. During the time of processing, the temperature of the smokehouse was elevated from 130° to 180° F., and 40 percent relative humidity was maintained throughout the smoke cycle.

Thus, Examples I and II dramatically illustrate that by the practice of this invention, cooking time of a sausage meat emulsion is reduced to less than 20 percent of the time required by the conventional smokehouse, thereby making it possible to process franks rapidly from the stuffing-linking operation as a continuous strand of sausages, to and through a cooking operation under closely controlled conditions. As a result, it is estimated that the labor formerly required in hanging linked frankfurters on smoke sticks, and labor for servicing smokehouse and showering operations, will be decreased to about 25 percent of former requirements.

Consequently, this invention is of considerable economic importance to the meat industry which presently produces 1,300,000,000 pounds of frankfurters per year. It is conservatively estimated by practicing this invention, resultant savings to the industry will amount to millions of dollars per year.

This invention is particularly useful for the manufacture of skinless frankfurters, which represents over 70 percent of frankfurter production in the United States.

It will be obvious to those skilled in the art that various changes and modifications may be made in the described method and apparatus without departing from the nature and spirit of the invention.

What is claimed is:

Apparatus for forming shaped meat products from a continuous strand of links of encased comminuted meat emulsion having tie portions between the links, which apparatus comprises:

(a) a horizontally elongated cooking tunnel;

(b) a conveyor for transporting said strand of encased links longitudinally through the cooking tunnel, said conveyor having a continuous link chain extending horizontally through the cooking tunnel with hooks depending vertically from said chain within said tunnel, said hooks being spaced along said chain at a distance less than the length of two cooked links;

(c) feed unit having means for engaging alternate tie portions and advancing said strand longitudinally, and means for displacing said alternate tie portions of said strand sideways onto said depending hooks at the input end of said tunnel so that said links hang from said hooks in a V-shape;

(d) means for feeding a hot stream of gas at a high velocity through said cooking tunnel for cooking the encased meat emulsion;

(e) and means for doffing the links of encased shaped meat product from said depending hooks at the output end of said tunnel.

References Cited in the file of this patent

UNITED STATES PATENTS

| | | |
|---|---|---|
| 1,494,904 | Hague | May 20, 1924 |
| 1,825,528 | Knudsen | Sept. 29, 1931 |
| 2,013,479 | Robinson | Sept. 3, 1935 |
| 2,070,850 | Trabold | Feb. 16, 1937 |
| 2,136,106 | Kern | Nov. 8, 1938 |
| 2,138,813 | Bemis | Dec. 6, 1938 |
| 2,312,339 | Jones | Mar. 2, 1943 |
| 2,439,780 | Napier | Apr. 13, 1948 |
| 2,533,080 | Alexander | Dec. 5, 1950 |
| 2,585,364 | Wright et al. | Feb. 12, 1952 |
| 2,623,451 | Prohaska | Dec. 30, 1952 |
| 2,789,914 | Davis | Apr. 23, 1957 |
| 2,839,409 | Matlen | June 17, 1958 |